United States Patent [19]

Porter

[11] Patent Number: 4,933,973
[45] Date of Patent: Jun. 12, 1990

[54] APPARATUS AND METHODS FOR THE SELECTIVE ADDITION OF NOISE TO TEMPLATES EMPLOYED IN AUTOMATIC SPEECH RECOGNITION SYSTEMS

[75] Inventor: Jack E. Porter, San Diego, Calif.

[73] Assignee: ITT Corporation, New York, N.Y.

[21] Appl. No.: 395,211

[22] Filed: Aug. 16, 1989

Related U.S. Application Data

[63] Continuation of Ser. No. 161,504, Feb. 29, 1988, abandoned.

[51] Int. Cl.$^5$ .............................................. G10L 5/00
[52] U.S. Cl. ........................................ 381/43; 381/46; 381/47
[58] Field of Search .............................. 381/43, 46, 47

[56] References Cited

U.S. PATENT DOCUMENTS

| | | | |
|---|---|---|---|
| 3,855,423 | 12/1974 | Brendzel | 381/47 |
| 4,000,369 | 12/1976 | Paul | 381/47 |
| 4,630,304 | 12/1986 | Borth | 381/47 |
| 4,720,802 | 1/1988 | Damoulakis et al. | 381/43 |
| 4,737,976 | 4/1988 | Borth | 381/46 |
| 4,741,036 | 4/1988 | Bahl | 381/43 |

*Primary Examiner*—Emanuel S. Kemeny
*Attorney, Agent, or Firm*—Thomas N. Twomey

[57] ABSTRACT

To improve the recognition of incoming speech signals in noise, the prestored templates of noise-free speech are modified to have the estimated spectral values of noise and the same signal-to-noise ratio as the incoming signal.

15 Claims, 8 Drawing Sheets

Fig. 3.

| | |
|---|---|
| BPF | BAND FILTERBANK. |
| $\bar{m}$ | VECTOR OF BPF SPECTRAL MAGNITUDE VALUES. |
| $\tilde{m}$ | RESULT OF AVERAGING SUCESSIVE PAIRS OF $\bar{m}$ (HALVING THE EFFECTIVE FRAME RATE). |
| $\bar{p}$ | VECTOR OF SQUARED MAGNITUDE (i.e. POWER) VALUES. |
| S | NUMBER OF RIGHT SHIFTS TO FIT $\tilde{m}$ VECTOR MAXIMUM COMPONENT IN 7 BIT FIELD. |
| $LOG_b$ | REPRESENTATION OF THE "LOG LOOK-UP TABLE" WHICH GIVES OUTPUT 127 WITH INPUT 127. ESSENTIALLY THE LOG TO BASE b, b = 1.03888. DEVIATES AT INPUT VALUE = 0.ONE INPUT CORRESPONDS TO 0.331dB. |
| $\bar{\ell}$ | SCALED LOG SPECTRAL PARAMETER VALUE. |
| $\rho$ | THE RELATIVIZED ENERGY PARAMETER. |
| $L^S$ | THE LOGARITHMIC INDICATOR OF SPEAKING LEVEL, AVERAGED OVER WORD TIME AND CHANNELS. A SCALAR ATTACHED TO WORDS. L VALUES ARE EXPRESSED IN "RECOGNITION UNITS" OF 0.331dB. |
| $\bar{L}^N$ | THE VECTOR OF NOISE LEVELS IN EACH CHANNEL AVERAGED OVER TIME. A VECTOR ATTACHED TO WORDS IN RECOGNITION UNITS. |
| M | MEL-COSINÉ TRANSFORM, ASSUMED ORTHOGONAL TO (1j...1), i.e. HAVING ROWS WHICH SUM TO ZERO. |
| $\beta$ | A SUPER SCRIPT INDICATING A BASE FORM. |
| NT | A SUPER SCRIPT INDICATING DATA FOR A NOISE-ADDED TEMPLATE. |
| $\bar{r}$ | THE RECOGNITION PARAMETER VECTOR, MEL TRANSFORM OF LOG-SPECTRAL DATA. |
| $\bar{f}, f$ | VECTOR & SCALAR INTERNAL FUNCTIONS. |

Fig. 6.

DEFINITION OF ENGINEERING PARAMETER (& VALUES)

| VALUE | | |
|---|---|---|
| $2^{-4}$ | $P_1$ - | NOISE FILTER TIME CONSTANT |
| 4 | $P_2$ - | DURATION (IN FRAMES) OF SPEAKING LEVEL SPIKE FILTER |
| $2^{-4} + 2^{-5}$ | $P_3$ - | SLOW RISE TIME CONSTANT OF $\tilde{e}$ FILTER |
| $2^{-1}$ | $P_4$ - | FAST FALL TIME CONSTANT OF $\tilde{e}$ FILTER |
| 60 | $P_5$ - | CUT OFF OF $I(r)$ FUNCTION |
| 10 | $P_6$ - | SIZE OF BOXCAR AVERAGER FOR P FUNCTION |
| ABOUT 25 | $P_7$ - | ARTIFACT THRESHOLD ON P |
| ABOUT 75 | $P_8$ - | SPEECH THRESHOLD ON P |
| 10 | $P_9$ - | DELAY IN RESUMING NOISE TRACKING AFTER SPEECH NUCLEUS |
| 7 | $P_{10}$- | DELAY IN RESUMING NOISE TRACKING AFTER ARTIFACT |
| 90 | $P_{11}$- | MINIMUM AMOUNT SPEAKING LEVEL ESTIMATE IS ALLOWED TO BE ABOVE NOISE LEVEL (SHOULD BE $\leq P_{17}$) |
| 10 | $P_{12}$- | INTERVOCALIC NUCLEAR INTERVAL. DONT DROP SPEAKING LEVEL FOR NUCLEII THIS CLOSE OR CLOSER TOGETHER |
| $2^{-1}$ | $P_{13}$- | FAST RISE TIME OF SPEAKING LEVEL ESTIMATE |
| 15 | $P_{14}$- | DECAY OF SPEAKING LEVEL ESTIMATE IS NOT ALLOWED WITHIN THIS MANY FRAMES OF PREVIOUS CHANGE IN THE ESTIMATE - CAUSES ESTIMATE TO BE BASED ON LOUDEST NUCLEUS |
| $2^{-1}-2^{-3}$ | $P_{15}$- | SLOW DECAY TIME OF SPEAKING LEVEL ESTIMATE |
| $2^{-9}$ | $P_{16}$- | TIME CONSTANT OF SPEAKING LEVEL ESTIMATE MOTION TOWARD NONIMAL VALUE, AFTER LONG PERIOD OF NO SPEECH |
| 120 | $P_{17}$- | "NONIMAL" ESTIMATE OF SPEAKING LEVEL IS NOISE LEVEL $\bar{e}_N$ PLUS $P_{17}$ IN $LOG_b$ UNITS 6.036=1dB 121=20dB |
| 5000 | $P_{18}$- | DELAY (IN FRAMES) FROM LAST DETECTED SPEECH BEFORE SPEAKING LEVEL STARTS TO DECAY TO NONIMAL VALUE |
| | $P_{19}$- | ARBITRARY CONSTANT USED TO ADJUST $LOG_b$ REFERENCE VALUE TO GET CONVENIENT SCALING |

APPARATUS AND METHODS FOR THE SELECTIVE ADDITION OF NOISE TO TEMPLATES EMPLOYED IN AUTOMATIC SPEECH RECOGNITION SYSTEMS

This application is a continuation of application Ser. No. 07/161,504, filed Feb. 29, 1988, now abandoned.

BACKGROUND OF THE INVENTION

This invention relates to speech recognition systems in general and more particularly to a speech recognition system employing templates wherein each of said templates is generated by the selective addition of noise to increase the probability of speech recognition.

As one can ascertain, the art of speech recognition in general has been vastly developed in the last few years and speech recognition systems have been employed in many forms. The concept of recognizing speech recognizes that the information obtained in a spoken sound can be utilized directly to activate a computer or other means. Essentially, the prior art understood that a key element in recognizing information in a spoken sound is the distribution of the energy with respect to frequency. The formant frequencies are those at which the energy peaks are particularly important. The formant frequencies are the acoustic resonances of the mouth cavity and are controlled by the tongue, jaw and lips. For a human listener the determination of the first two or three formant frequencies is usually enough to characterize vowel sounds. In this manner, machine recognizers of the prior art included some means of determining the amplitude or power spectrum of the incoming speech signal. This first step of speech recognition is referred to as preprocessing as it transforms a speech signal into features or parameters that are recognizable and reduces the data flow to manageable proportions. In regard to such, one means of accomplishing this is the measurement of the zero crossing rate of the signal in several broad frequency bands to give an estimate of the formant frequencies in these bands.

Another means is representing the speech signal in terms of the parameters of the filter whose spectrum best fits that of the input speech signal. This technique is known as linear predictive coding (LPC). Linear predictive coding or LPC has gained popularity because of its efficiency, accuracy and simplicity. The recognition features extracted from speech are typically averaged over 10 to 40 miliseconds then sampled 50–100 times per second.

The parameters used to represent speech for recognition purposes may be directly or indirectly related to the amplitude or power spectrum. Formant frequencies and linear predictor filter coefficients are examples of parameters indirectly related to the speech spectrum. Other examples are cepstral parameters and log-area ratio parameters. In these and most other cases the speech parameters used in recognition are, or can be, derived from spectral parameters. This invention is related to the selective addition of noise to spectrum parameters generating speech recognition parameters. This invention applies to all forms of speech recognition which use speech parameters which are, or can be, derived from spectral parameters.

In any event, one of the most popular approaches to speech recognition in the past has been the use of templates to provide matching. In this approach words are typically represented in the form of parameter sequences. Recognition is achieved by using a predefined similarity measure to compare the unknown template token against stored templates. In many cases, time alignment algorithms are used to account for variability in the rate of production of words. Thus, template matching systems can achieve high performance with a small set of accoustically distinct words. Some researchers have questioned the ability of such systems to ultimately make fine phonetic distinction among the wide range of talkers. See for example an article entitled "Performing Fine Phonetic Distinctions: Templates versus Features" in Variability and Invariance in Speech Processes" by J. S. Perkel and D. H. Klatt, editors, Hillsdale, N.J.: Lawrence Erlbaum Associates, 1985, authors R. A. Cole, R. M. Stern and M. J. Lasry.

Thus as an alternative, many people propose a feature-based approach to speech recognition in which one must first identify a set of acoustic features that capture the phonetically relevant information in the speech signal. With this knowledge, algorithms can be developed to extract the features from the speech signal. A classifier is then used to combine the features and arrive at a recognition decision. It is argued that a feature-based system is better able to perform fine phonetic distinctions than a template matching scheme and thus is inherently superior. In any event, template matching is a technique which is often used in pattern recognition whereby an unknown is compared to prototypes in order to determine which one it most closely resembles.

By this definition, feature-based speech recognitions that use multi-variate Gaussian models for classification also perform template matching. In this case, the statistical classifier merely uses a feature vector as a pattern. Similarly, if one regards spectrum amplitude and LPC coefficients as features then spectrum based techniques are feature-based as well.

In regard to use, template matching and feature-based systems really represent different points along a continuum. One of the most serious problems with the template matching approach is the difficulty of defining distance measures that are sensitive enough for fine phonetic distinctions but insensitive to the irrelevant spectral changes.

One manifestation of this problem is the excessive weight given to unimportant frame-to-frame variations in the spectrum of a long steady-state vowel. Thus the prior art, aware of such problems, has proposed a number of distance metrics that are intended to be sensitive to phonetic distances and are insensitive to irrelevant acoustic differences. See for example an article entitled "Prediction of Perceived Phonetic Distance from Critical Band Spectra" by D. H. Klatt, published in the *Procedures ICASSP-82, IEEE* Catalog No. CH1746-7, pages 1278–1281, 1982.

In any event, in order to gain a better understanding of speech communication systems, reference is made to *Proceedings of the IEEE*, November 1985, Volume 73, No. 11, pages 1537–1696. This issue of the *IEEE* presents various papers regarding man-machine speech communications systems and gives good insight to the particular problems involved. As one will understand, a major aspect in regard to any speech recognition system is the ability of the system to perform its allocated task—namely, to recognize speech in regard to all types of environments.

As indicated, many speech recognition systems utilize templates. Essentially, such systems convert utterances into parameter sequences which are stored in the computer. Sound waves travel from a speaker's mouth through a microphone to an analog-to-digital converter where they are filtered and digitized along with, for example, background noise, which may be present. The digitized signal is then further filtered and converted to recognition parameters, in which form it is compared with stored speech templates to determine the most likely choice for the spoken word. For further examples of such techniques, reference is made to the *IEEE Spectrum*, Vol. 24 No. 4, published April 1977. See an article entitled "Putting Speech Recognizers to Work" pages 55–57 by T. Wallich.

As one can ascertain from that article, the utilization of speech recognition systems are constantly being expanded in regard to application and there are many models which are already available which are employed for various applications as indicated in that article. The formation of templates is also quite well known in the prior art. Such templates are employed with many different types of speech recognition systems. One particular type of system is known as "A Key word recognition system" as described in the publication entitled "An Efficient Elastic-Template Method for Determining Given Words in Running Speech" by J. S. Bridle, "British Accoustical Society Spring Meeting", pages 1-4, April 1973. In this article the author discusses the derivation of elastic templates from a parametric representation of spoken example of key words to be detected. A similar parametric representation of the incoming speech is continuously compared with these templates to measure the similarity between the speech and the key words from which the templates were derived.

A word is determined by the recognizer to have been spoken when a segment of the incoming speech is sufficiently similar to the corresponding template. The word templates are termed "elastic" because they can be expanded and compressed in time to account for variations in the talking speed and local variations in the rate of word pronunciation.

Key word recognition is similar to conventional speech recognition. In the former, templates are stored only for "key" words to be recognized within a context of arbitrary words or sounds, whereas in the latter templates are stored for all the speech anticipated to be spoken. All such systems, whether they be key word recognition systems or conventional speech recognition systems that employ templates encounter the same problems—namely the inability of the system to recognize the spoken word is uttered for example by different individuals or as uttered by the same individual under different conditions.

It is therefore an object of the present invention to provide apparatus and methods for an improved automatic speech recognition system.

It is a further object of the present invention to provide a speech recognition system which automatically adapts to a noisy environment.

As will be further understood from the appended specification, most speech recognition systems suffer from a degraded operation in the presence of noise. This degradation is particularly severe when the templates have been derived from speech with little or no noise, or with a noise of different quality from that present when recognition is attempted. Previous methods of reducing this difficulty require the production of new templates in the presence of the new noise. This production necessitates the collection of new speech and noise.

In this particular system there is an analytical addition of noise to templates which permit an improved recognition probability thereby substantially improving the system performance, and it does not require collecting new speech for template generation.

BRIEF DESCRIPTION OF THE PREFERRED EMBODIMENT

In a speech recognition system of the type including a spectrum analyzer for providing spectral magnitude values of utterances at an output and for comparing stored templates with processed spectral values to provide an output upon a favorable comparison indicative of the presence of speech in said utterance, the improvement therewith of apparatus for generating said stored templates, comprising first means coupled to said spectrum analyzer for providing a signal indicative of the expected noise signal of an incoming signal, and means coupled to said first means and responsive to said predicted noise signal to generate templates which are modified according to said predicted noise signal.

BRIEF DESCRIPTION OF THE FIGURES

FIG. 3 is a Table giving the definitions of the various outputs indicated in FIG. 2.

FIG. 6 is a Table giving the definitions of engineering parameters according to FIGS. 5A-5C.

DETAILED DESCRIPTION OF THE FIGURES

As will be seen, the present invention applies to all recognition systems which use parameters which are, or are derived from those which are, spectral in nature. In the latter case it may be necessary to store templates in two forms: spectral for analytic addition of noise and operational templates.

Figure 1A:
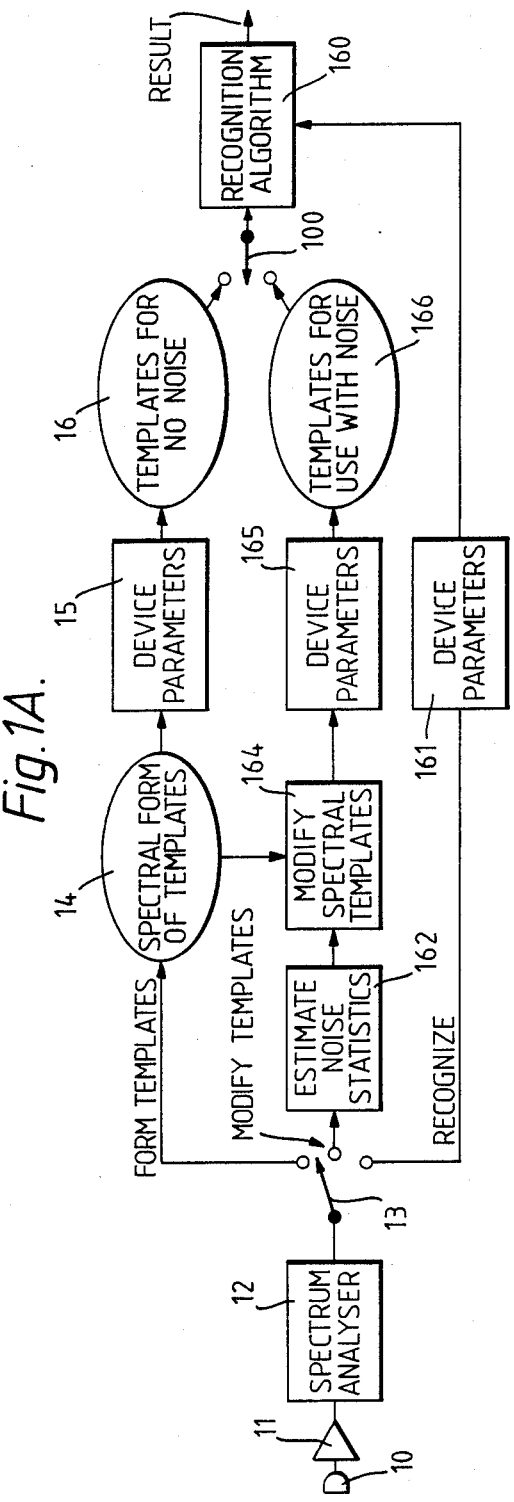
FIG. 1A is a block diagram showing a speech recognition system using recognition parameters derived from spectra employing the present invention.

Referring to FIG. 1A, there is shown a block diagram of a speech recognition system according to this invention and which uses recognition parameters derived from spectra.

There is shown a microphone 10 into which a speaker utilizing the system speaks. The microphone 10 conventionally converts the sound waves to electrical signals which are amplified by means of an amplifier 11. The output of the amplifier 11 is coupled to a spectrum analyzer 12. The spectrum analyzer may be a wide band or a narrow band type of spectrum analyzer with a short term analysis capability. The function and structure of the spectrum analyzer is essentially well known and can be implemented by a number of techniques.

The spectrum analyzer operates to divide the speech into short frames and provides a parametric representation of each frame at its output. The particular type of acoustic analysis performed by the spectrum analyzer is not critical to this invention and many known acoustic analyzers or spectrum analyzers may be employed. Examples of such are given in U.S. Application Ser. No. 439,018 filed on Nov. 3, 1982 for G. Vensko et al. and Ser. No. 473,422 filed on Mar. 9, 1983 for G. Vensko et al. Both commonly assigned to ITT Corporation, the assignee herein, and incorporated herein by reference.

Reference is also made to U.S. Application Ser. No. 655,958 filed on Sept. 28, 1984 for A. L. Higgins et al. and entitled KEYWORD RECOGNITION SYSTEM AND METHOD USING TEMPLATE-CONCANTENATION MODEL.

The spectrum analyzer 12 may include a 14 channel bandpass filter array and utilizes a frame size of 20 miliseconds or greater. These spectral parameters are processed as shown in FIG. 1A. As indicated, the output of the spectrum analyzer is coupled to a switch 13 which can be operated in a Recognize, a Form Template, or a Modify Template Mode.

When the switch 13 is placed in the Form Template Mode, the output of the spectrum analyzer 12 is coupled to a module 14 designated as spectral form of templates. The purpose of module 14 is to assist in forming templates from the output of the spectrum analyzer. These templates, which are formed in module 14, are a spectral form of templates and many techniques for forming such templates are well known. Essentially, in the Form Template Mode the output of the spectrum analyzer 12 is processed by the module 14 which provides templates in regard to utterances made by the speaker through microphone 10. The speaker is prompted to speak words to be recognized and essentially templates indicative of the spoken words are generated. These templates are utilized by module 15 to derive recognition parameters derived from the spectra formed templates for the generation of final templates as indicated by module 16 for a low or no noise condition. The templates for the no noise condition, as indicated by module 16, are then stored and are indicative of particular utterances, as for example words, phrases and so on, uttered by the particular speaker.

The templates, as stored, are coupled via a switch 100 to a processor 160 which performs a recognition algorithm. Thus, as one can ascertain, the processor 160 operates in the recognition Mode to compare unknown speech with templates, as stored in module 16, which were generated for a no noise condition. Thus, as indicated in FIG. 1A, in the Form Template Mode one provides spectral form of templates to obtain template parameters which template parameters are then utilized to form templates for no noise or low noise conditions. The processor, as implemented, can operate with the templates stored in module 16 for a no noise or low noise condition, as will be explained. The function of the processor 160 is also well known and essentially operates to provide a match based on various distance measurements or other algorithms. When such a match is made there is an indication provided that this is a correct word and hence that word or sound is then the system output.

As one can ascertain, switch 13, when placed in a Recognize Mode, enables the output of the spectrum generator 12 to be coupled to a derive parameter module 161 which essentially derives parameters from the spectrum analyzer which parameters will be compared with the stored templates as, for example, described above and stored in module 16. As seen in FIG. 1A the switch 13 can also be placed in the center position. In the center position, also designated as the Modify Template Mode, the output of the spectrum analyzer enters an estimate noise statistic module 162. As one will understand, the function of module 162 is essentially to provide a noise analysis or to process noise to provide an estimate of noise statistics. This is a major aspect of the present invention whereby the present invention selectively adds noise to form templates to implement speech recognition and to achieve an improvement in such recognition in the presence of such additive noise.

Thus the function of the estimate noise statistics module 162, which will be further described, operates to modify the spectral templates as formed in module 164 which is coupled and receives its information from module 14. The output of module 164 derives recognition parameters in module 165 which parameters are utilized to form templates, as indicated by module 166, for use with noise or at low noise levels. Hence as one can see, the system depicted in FIG. 1A enables recognition to be performed with templates for use with noise or templates for use with very low noise or no noise via switch 100.

As indicated briefly above, in the Recognize Mode the spectral parameter output of the spectrum analyzer 12 is provided to the input of the processor 160 via the derive parameter module 161. The processor 160 typically performs an algorithm which again is not critical to the invention. The processor 160 determines the sequence of the stored templates and provides the best matches to the incoming speech to be recognized. Hence the output of the processor essentially is a string of template labels where each label represents one template in the best matching template sequence.

For example, each template may be assigned a number and a label. It may be a multibit representation of that number. This output is provided to a template search system included in the processor 160 which when there is a multibit representation, for example, may be a comparator with a storage device for template labels. Thus the processor 160 operates to compare each incoming template label with the stored templates. The subsystem 160 can then provide an indication that a particular word o& phrase has been spoken as well as what word or phrase.

In either the Form or Modidy Template Mode the user speaks various words and recognition parameters are derived from the spectrum output of the spectrum analyzer 12. In the Modify template Mode the system operates to produce various templates for use in conjunction with the system in the Recognize Mode which templates, as indicated above, are modified by the selective addition of noise via the estimate noise statistic generator 162. The selective addition of noise by means of the generator 162 provides a more reliable system operation, as will be further explained.

Figure 1B:
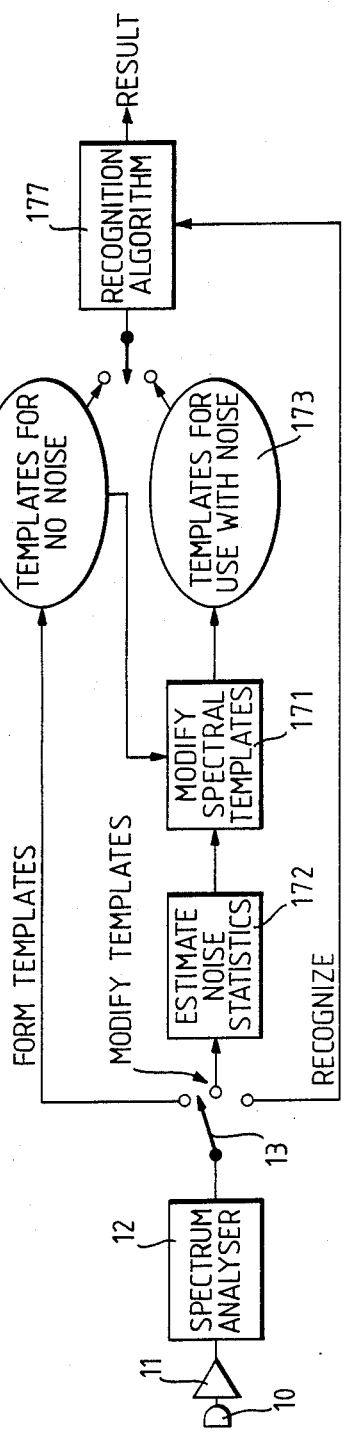
FIG. 1B is a block diagram showing an alternate speech recognition system using recognition parameters which are spectral in nature according to this invention.

Referring now to FIG. 1B there is shown a recognition system which employs recognition parameters which are spectral in nature. In any event, the same functioning parts have been designated by the same reference numerals in FIG. 1B. As one can ascertain, there is a microphone 10 coupled to the input of an amplifier 11 whose output is coupled to the input of the spectrum analyzer 12. The spectrum analyzer 12 output is again coupled to a switch 13 which can be operated in a Form Template, a Modify Template or a Recognize Mode.

As one can ascertain from FIG. 1B, in the Form Template Mode templates are formed for low or no noise conditions via module 170. This module 170 forms templates directly providing recognition parameters which are spectral in nature. The form templates are then stored and also coupled to module 171 which modifies the spectral templates as for example derived from module 170 under the influence of an estimate noise statistic generator 172 which essentially functions as the noise generator 162. The output of the modified spectral template module 171 is coupled to module 173 which stores templates for use with a noise condition. Again, a processor 177 is depicted which processor can operate either with the templates as stored in module 170 or with the templates as stored in module 173.

In any event, before proceeding further, it is known in the prior art how to generate templates according to prior art techniques. There are several different ways of generating templates. Methods which accomplish the task of template generation are automatic and normally employ a multi-stage or a two-stage procedure. In one such approach speech data from the training utterance (Template Mode) is divided into segments. These segments are then applied as an input for a statistical clustering analysis which selects a subset of segments that maximizes a mathematical function based on a measure of distance between segments. The segments belonging to the selected subset are used as templates.

Such techniques are described in the above-noted copending application Ser. No. 655,958. In any event, the various techniques for measuring distances are well known as indicated by some of the above cited references in the Background of the Invention. One technique of providing distance measurements which is widely employed is known as the Mahalanobis distance computation.

For examples of this particular technique reference is made to a copending application entitled MULTIPLE PARAMETER SPEAKER RECOGNITION SYSTEM AND METHODS, filed on Jan. 16, 1987, Ser. No. 003,971 to E. Wrench et al. This application gives various other examples of techniques employed in speaker recognition systems and describes in detail some of the algorithms employed in conjunction with such systems. In any event, and again referring to FIG. 1, it will be ascertained that the major aspect of the present invention is related to such speech recognition systems as shown in FIG. 1 which utilize template to provide a comparison with incoming speech to thereby make a decision as to which word is being spoken. The technique can be employed in key word recognition systems, speech recognition systems, speaker recognition systems, speaker verification systems, language recognition systems, or and system which utilizes templates or a combination of various templates to make a decision in regard to an uttered sound.

Before proceeding with an explanation of the structure and techniques employed in this invention, certain aspects and considerations of the present invention are considered.

The inventor has determined that when templates have the same signal-to-noise ratio as the unknown or uttered speech, the recognition performance is better than with templates with less noise or more noise. Hence if it is assumed that the signal-to-noise ratio of the audio signal can be predicted then recognition performance can be optimized by modifying templates before they are used in such a way that they are "as if" they were generated from speech with the same signal-to-noise ratio as the upcoming unknown speech.

Thus in order to practice the present invention, the following considerations are applicable. The first is to predict the signal-to-noise ratio of upcoming speech and the second is to modify the templates to meet the "as if" requirement. Prediction is based on both theoretical and empirical considerations. In most applications one can reasonably expect a user to speak at a relatively constant level, either absolutely in the case of low level or constant noise or at a relatively constant level above that noise. One can then use the speech and noise level to predict the signal-to-noise ratio of the unknown speech. As will be explained, this is accomplished by the use of a speech and noise level tracker module. In certain instances it is assumed that both the speaking level and the noise level in each filter channel changes slowly enough that the current values are useful estimates of the values in the near future.

Hence by modifying noise-free or relatively noise-free templates so that they are the same "as if" they had been made from noisier speech is based on both empirical and theoretical considerations.

Research has determined that it is an excellent approximation to assume that noise and speech powers add in each individual filter bank channel. A more accurate approximation is that the combination of speech and noise has a non-central Chi squared distribution, with the number of degrees of freedom related to the filterbank channel bandwidth. From this and other considerations, more precise estimations can be made of the expected value of the combination of known speech power with a noise of known statistical properties. The increased precision in the "addition of noise" thus obtained does increase the precision of the templates produced, but does not significantly increase recognition accuracy beyond the improvement obtained using the "powers add" rule. The following discussion therefore continues to refer to the powers add rule, although the process can be made more theoretically precise by substituting an alternate method of estimating the expected value of the combination of speech and noise power. Such a substitution does not alter the intent or practice of this invention.

It is further observed that both internal electronic and quantization noise combines with acoustic noise and signal in regard to the "powers add" rule. They may be smaller than the acoustic noise of interest but this is applicable. Hence one can use the "powers add" result in constructing various models so that the application of the research work is manifested through a continuing effort to use the numbers which are derived from valid models. This will be explained subsequently.

It has been shown that templates which would result from a noise power equal to its average value behave very well in regard to producing reliable recognition outputs. Hence it is not necessary to predict the frame-to-frame variability of the noise power and at is sufficient to use the average value. The template parameters which are sought are those which would be produced from the same speech power as that effectively in the Base Form template combined with the current average noise power.

The channel noise power values from the system are estimates of the noise power and they may be taken to be related to the average noise power as can be mathematically determined. For a full understanding of the present procedure and the justification therefore, the following considerations are applicable.

It is first indicated that the probability distribution of the output of a single discrete Fourier transform (DFT) of a speech signal corrupted by additive zero mean Gaussian noise can easily be calculated. The next factor to be considered and important for extending the model of how speech and noise combine so as to be applicable to each channel of a bandpass filter bank indicates that the channels have or may have a much wider bandwidth than a single DFT channel. Hence the noise power parameter and the number of contributing channels can be estimated by observing the output of the bandpass filter in the absence of speech and in the presence of noise.

The next step was to realize that speech recognition templates formed in the absence of noise might be improved for use in the presence of noise by modifying them to be equal to their expected value in the presence of noise. Hence the method to be employed is that for each speech sample and each bandpass filter channel represented in a noise-free template, one then substitutes the expected value of the noise-free template as modified by the presence of the current noise.

Hence by measuring the average and the variance at the output of the bandpass filter channel one can therefore estimate the properties of the channel by the way it passes Gaussian noise. Essentially, as one can understand from the above (and many of the above considerations have been mathematically proven) there is both a theoretical and empirical basis for the implementation of this invention. Essentially as indicated, the nature of this invention is the analytical addition of noise to form templates which formed templates operate to increase the reliability of speech recognition systems.

In any event, there are two ways to add noise to template data collected in a noise-free environment and thus form new templates for use in a noisy environment. A rigorous way is to add noise to each template token then average the results. An approximate way is to average the noise-free tokens to form Base Form data and modify the data by adding noise appropriate to current conditions, using the "powers add" or other convenient or more precise rule. The rigorous way requires keeping all the templates and tokens around and requires excessive storage. The approximate way provides essentially the same templates and recognition results. There is a main assumption which is implicit in the implementation. That is that template data are noise free relative to the environment in which they are used.

Figure 2:
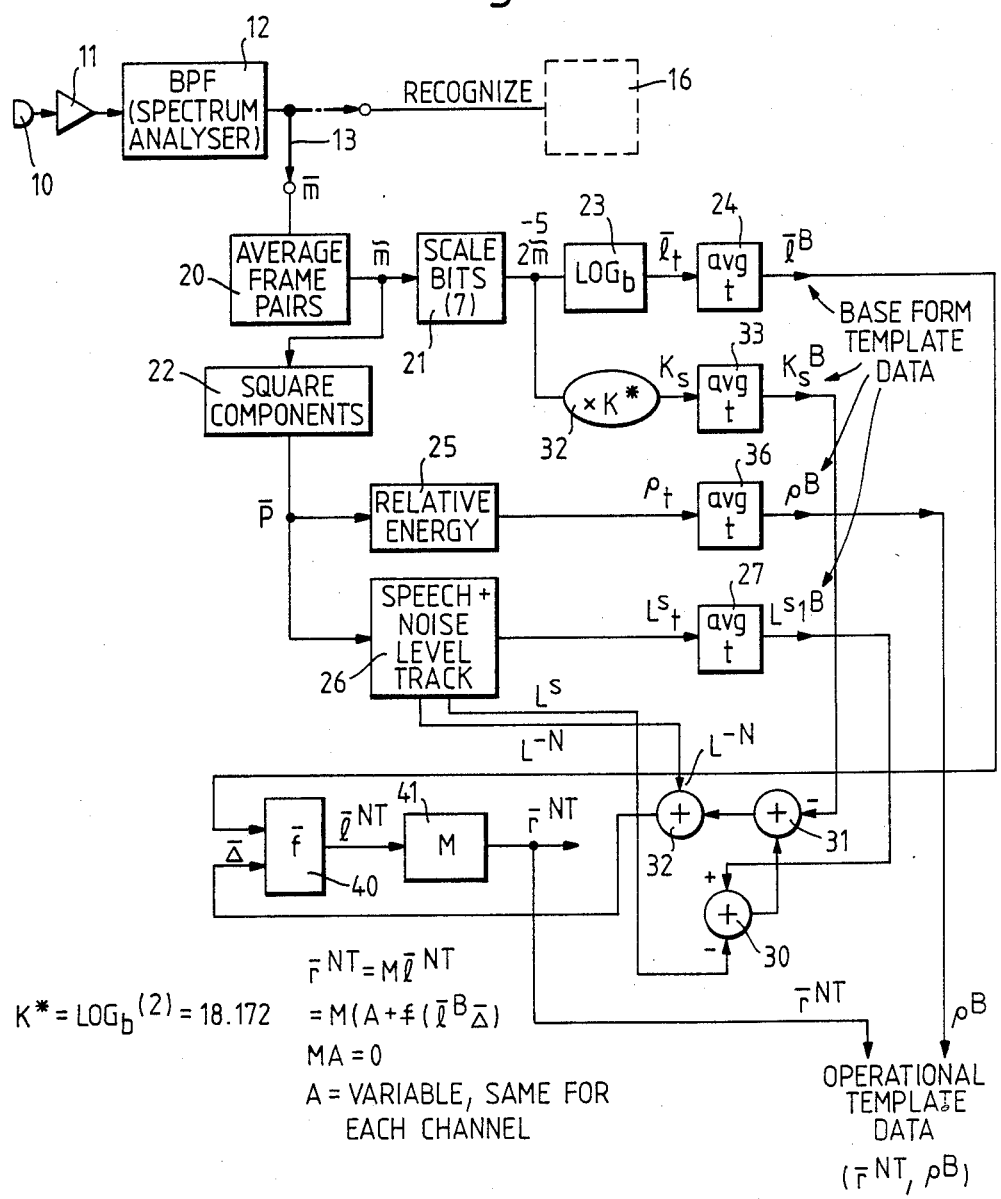
FIG. 2 is a detailed block diagram showing a technique according to this invention for forming operational template data.

Referring to FIG. 2, there is shown a detailed block diagram of template formation employed by adding noise to a Base Form template. The Base Form Template is itself an average formed over a set of work "tokens". Each token consists of parameters taken from one utterance of the given word. One or more tokens may be arranged to form a Base Form Template. Base Form templates are formed during quiet conditions and stored in a module 16 of FIG. 1A or module 170 of FIG. 1B. It is noted that FIG. 3 is a Table defining each value depicted in FIG. 2. As one can ascertain from FIG. 2, there is shown again the microphone 10 into which a speaker utters. The output of the microphone is coupled to the input of amplifier 11 which then has its output coupled to the spectrum analyzer which is indicated as BPF or bandpass filter bank 12. The switch 13 is in the modify template position. The output from the bandpass filter bank 12 is the vector of the bandpass filter spectral magnitude values and is applied to a module 20 which module 20 serves to average frame pairs.

The averaging of frame pairs is a well known technique and essentially is implemented by many well known circuits. The output of the module 20 is the result of averaging successive pairs of the input from the spectrum analyzer 12 and module 20 serves to half the effective frame rate. The output of module 20 is applied to a scale bit module 21 and to a square component module 22. The square component module 22 provides a vector output which is equal to the squared magnitude which essentially is the power value of the output of the average frame pair module 20.

The output of the scale bit module 21 essentially serves to provide twice the averaging of the successive pairs implemented by a series of shifts to enable one to fit the vector maximum components into a 7-bit scale. Hence the module 21 is a shift register which essentially provides a number of right shifts to implement the described operation. The output from the scale bit module 21 is directed to a logarithmic converter 23 which produces at its output a scaled log spectral parameter vector. This parameter vector is then averaged over a given set of template tokens by the module 24 to provide at the output the scaled log spectral parameter which essentially provides one parameter of the Base Form template. The output from the square component module 22 is directed to an input of module 25 designated as a relativized energy module and to an input of module 26 designated as a speech and noise level tracker.

The output from the relative energy module 25 is a parameter indicative of the relative energy as for example determined by averaging the energy from the output of the square component module 22. This is averaged over template tokens by module 36 to provide an averaging indicative of the output vector which is the relative energy parameter necessary to provide another Base Form data value. The output from the speech and noise level tracker 26 is as will be explained indicative of the energy level which is again averaged by module 27 to provide at its output the energy level of still another Base Form nature. The speech and noise level tracker which will be further described provides two additional outputs, one of which is a logarithmic indicator of the speaking level averaged over a word time and channel which is a scaler attached to words and the other is the vector of the noise level in each channel averaged over time but not in regard to channel. This is also a vector attached to word recognition units. Thus it is seen that the output from module 27 is applied to a first adder module 30 which receives an additional output from the speech and noise level tracker. The output of adder 30 is applied to one input of an adder 31 which received at its other input an output derived from the scale bit module 21. The output of the scale bit module 21 is multiplied via module 32 by a factor K which is equal to 18.172 and which is further defined in Table 3. This value is then averaged by module 33 to produce at its output the Base Form value of the log value which is applied to the other input of adder 31. The output of adder 31 is applied to adder 32. Adder 32 receives as another input the output from the speech and noise level tracker 26 which again is the vector of the noise levels in each channel. This output is applied to one input of a function module 40 which receives at its other input the output from module 23. The output from the function module 40 is the scale log spectral parameter vector for a noise added template. This is applied to a function module 41 to provide at its output the recognition parameter vector which is the mel-cosine transform matrix for the particular utterance. Thus the output from module 41 and the output from module 26 are utilized to provide the operational template data.

As indicated, all the outputs associated with the block diagram of FIG. 2 are described in FIG. 3. As one can ascertain from the above, the effective spectral magnitude value for the Base Form template as derived from FIG. 2 is essentially given by the following equation.

$$\overline{M}^B = 2^{SB} \exp_b(\overline{l}^B)$$ and the effective power is given by the following equation.

$$\overline{P}^B = \overline{M}^{LB} = 2^{2SB} \exp_b(\overline{2l}^B)$$

See FIG. 3 for definitions.

In any event, as one can ascertain, before adding noise, the power in each frame is modified so that the average speaking level of the template indicated at the output of module 27 of FIG. 2 is the same as the current speaking level indicated by the output of the speech and noise level tracker 26 as applied to the input of adder 30. Since the values are in recognition units (0.331 db) the effective power in the Base Form is changed which is indicated at the output of module 26. To this the current noise power level is added and one therefore obtains the effective power level of the noise added template so that the effective magnitude of the noise added template is shown as the output of module 41.

Thus all the operational recognition parameters are in the mel-cosine transform of the log spectral parameters and are relative energy measures. As indicated, all of the above should be obvious to one skilled in the art after the reviewing of FIG. 2 together with the definitions of FIG. 3 and the mathematics for the same should be apparent.

By using the same exact techniques, one can therefore form templates by adding noise to template tokens and then averaging. Essentially, the process for accomplishing this is similar to that shown in FIG. 2 whereby one can therefore provide the same exact outputs as shown in FIG. 2 with the exception that the averaging may be accomplished after the functional unit 40.

Figure 4:
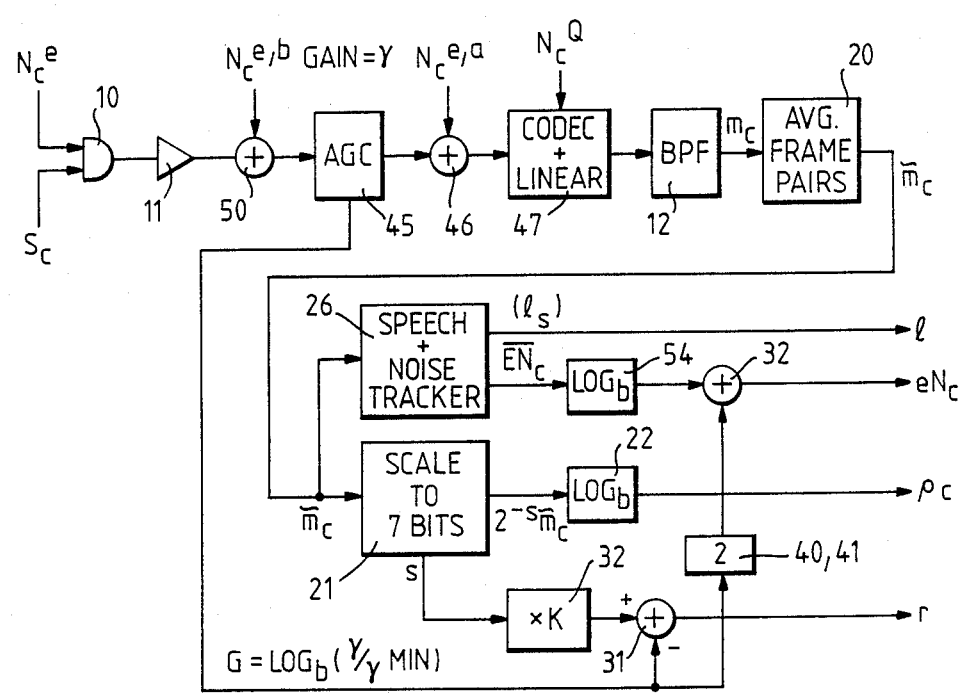
FIG. 4 is a detailed block diagram of an alternate embodiment of this invention.

Referring to FIG. 4, there is shown a more detailed block diagram of a typical system employing a template formation scheme as indicated above. In regard to FIG. 4, the same reference numerals have been utilized to indicate similar functioning components. As one can see in FIG. 4, there is included a AGC or automatic gain control module 45 which is coupled to one input of an adder 46 with the output of the adder coupled to a coder/decoder (CODEC) module and linearizer circuit 47. Essentially, the coder/decoder module may be a analog-to-digital converter followed by a digital-to-analog converter. The output of the Codec is applied to the synthesizer or bandpass filter bank 12.

The output from the bandpass filter 12 goes to averaging frame pair module 20 which again is associated with a scale module 21 and the speech and noise track module 26 which will be explained. The output lines as shown on the right side of FIG. 4 provide the various operational template data values which are utilized to thereby form templates in the presence of noise.

As one can ascertain, a major functioning module is the speech noise tracker 26 which will be further described. Again, referring to FIG. 4, it is shown that the inputs to the microphone 10 are labeled $N_c$ and $S_c$ which are the significant signal and noise sources. By the subscript "c" it is indicated that these represent the average spectral magnitude over the bandpass of each of the filter bank channels forming the spectrum analyzer 12. In any event, each subscript "C" has 14 values, one for each filter in the filter bank. Therefore, $S_c$ is the spectral magnitude in channel C of the acoustic speech signal while $N_c$ is the root mean square spectral magnitude of the acoustic noise for that channel. The outputs from adders 50 and 46 are spectral magnitudes of electronic noise which is injected before and after the AGC gain control 45. The output from the CODEC 47 contains the spectral magnitude of the quantization noise introduced by the CODEC. In any event, the output of the bandpass filter bank 12 is the vector of the bandpass filter spectral magnitude values while the output of the average frame pair module 20 is the result of averaging successive pairs of the spectral magnitude values.

The effective output signal of the filter bank 12 is an estimate of the spectral magnitude of the signal at the filter bank input over the pass band of the filter bank and this is indicated for each channel in the filter bank. Successive pairs of these values are averaged to produce the output from the module 20 at a rate of 50 per second.

Essentially, the set of all values for all 14 channels are all shifted right by the same number S in module 21 so that the largest occupies 7 bits or less and the resultant values are converted by a Table lookup to number proportional to the logarithm. The Table returns 127 for an input of 127 so that the result can be considered as 26.2 times the natural logarithm of the input, or equivalently, the logarithm to the base b, where b equals 1.03888. The 20 milisecond frame values are also used by the tracker 26 to produce a measure of the peak speech energy and an estimate of the mean noise energy for each channel. The speaking level is an estimate of the log to the base b of the total speech energy at the microphone 10 plus an arbitrary constant.

The effect of the AGC gain is essentially removed and thus is not a spectral value. For example, it is related to the total energy of the pass band of the whole filter bank. The speaking level estimate is also word or phrase related. Its time constants are such that it is a measure of the level at which short utterances are spoken. There is therefore only one level value to be associated with each template or unknown segment of template duration. The time constraints of the noise estimates from the tracker 26 are also such that only one noise level estimate should be assigned to each channel over the time periods of utterance length. Hence the output values from the speech and noise tracker 26 as coupled to the logarithmic circuit 54 of FIG. 4 are mean energy estimates for the output of the filter bank. They are therefore affected by AGC gain and they are directly proportional to the average spectral energy without logarithmic transformation.

It is assumed that the signal and the various noise sources are statistically independent and that their energies add on the average. This is not only a convenient way for determining the internal noise sources but has been demonstrated to be an excellent approximation for both the acoustic noise and the signal sources. Furthermore, it is assumed that there are noise values which can be referred to as equivalent noise power at the microphone. These values include acoustic noise power and other system noise power some of which are reduced by the AGC 45 gain.

Thus the scale factors as derived from FIG. 4 and as indicated in FIGS. 2 and 3 are provided to produce noise related templates. Thus by employing the template averaging process, one can produce an average template which is the same or equivalent to what would be attained by averaging the log spectral parameters of all tokens at the same speaking level and signal to noise ratio. Thus in order to simplify the entire problem, one makes the assumption that there are equal signal-to-noise ratios in all templates and as well as in all template tokens. This can be accomplished by adjusting the speaking levels in all tokens to be equal and therefore the result of equal signal-to-noise ratios is equal noise value in all tokens. Under this assumption, one can make all forms of averaging the noise equivalent.

As indicated above, research has shown that when templates have the same signal-to-noise ratio as the unknown speech recognition performance is better than with templates with less noise or more noise. Thus it is indicated that based on the above techniques, the signal-to-noise ratio of the audio signal can be predicted and therefore recognition performance can be optimized by modifying templates before they are used in such a way that they are "as if" they were generated from speech with the same signal-to-noise ratio as the upcoming unknown speech.

Thus as indicated, two steps are employed. One is to predict the signal-to-noise ratio of upcoming speech and then modifying the templates to meet this requirement. Hence as will be explained, the speech and noise tracker 26 does not form an estimate of the speech power in each channel as this would vary from word to word depending on the phonetic content of each. Thus since one cannot predict what words will be spoken, the data would have no predictive power. The importance is that for normal procedures, one would have no estimate of the signal-to-noise ratio for each channel. Therefore, the template modification procedure as indicated above, avoids the use of specific signal-to-noise values on a channel basis. Thus it is indicated that templates which result from a noise power equal to its average value behave very well in a recognition system.

That is, it is not necessary to be concerned about the frame-to-frame variability of the noise power as it is sufficient to use the average value. The template parameters are then those which would be produced from the same speech power as effectively exists in the "base form" templates combined with the current average noise power. Essentially, as indicated above, the speech and noise tracker module 26 is a digital signal processing (DSP) circuit which operates to execute an algorithm which provides a measure of the power level of a speech signal in the presence of additional acoustic noise and also a measure of the average noise power in the bandpass filter bank channels of any arbitrary form. The measure of speaking level found is indicative of the speakers conversational level suitable for adjusting the signal-to-noise ratio for purposes of speech recognition. Other measures of speaking level vary quickly and/or with the relative frequency of occurrence of voiced and unvoiced sounds within the talked speech. The measure found by the speech and noise tracker avoids these problems by detecting the slightly smoothed peak power in vocalic nuclei.

More specifically, it tracks the slightly smoothed peaked power in the more energetic vocalic nuclei. By ignoring power peaks during unstressed syllable nuclei and during speech intervals which are not vocalic nuclei, the measure is a continuous indication of the general speaking level. The tracker is intended for use in the presence of additive noise uncorrelated with the speech present when the total noise power usually varies slowly compared to the rate of vocalic nuclei production in speech (typically 5 to 15 per second). The tracker also is operative to recover from more rapid changes in noise level. The speech and noise tracker 26 uses a logarithmic or compression technique whereby there is provided a measure of total speech power over the frequency range of interest. This measure is first subjected to a slow- rise, fast-fall filtering process with the rise and fall time constraints chosen so that a large positive difference exists between the instantaneous signal power and the filtered value during the first few milliseconds of vocalic nuclei while large negative values of that difference do not occur.

Hence a non-linear function of the difference between the instantaneous signal power and the fast-fall, slow-rise time filtered value is then directed to a moving box-car integration process of suitable duration so that the resulting value rises above an appropriate threshold only during normal or stressed vocalic nuclei in speech intervals, usually skipping unstressed vowel nuclei. The crossing of that threshold is then used to identify an interval of high signal power as due to speech nuclei. Only intervals thus identified are used for speaking level tracking. Values from the box-car integration process which are greater than a second threshold which is lower than the speech nuclei threshold are then used to identify intervals which contain speech power as well as noise power. Only intervals where the boxcar integration value is lower than the second (lower) threshold and where the instantaneous power is not more than a third threshold above its fast-fall, slow-rise filtered value are used as the input to the noise power tracking function.

As indicated, the noise power tracking module essentially may include a digital signal processor module implemented by an integrated circuit chip. Many such chips are available which essentially are programmable and adapted to execute various types of algorithms. The algorithm which is associated with the noise and signal tracking function operates to determine both the signal energy content and the noise energy content and does so in the following manner.

One first obtains a mathematical value which is indicative of the channel energies. This is done in each and every frame. Then the total energy is calculated. The system can then proceed to accommodate for automatic gain control changes. Once the energy is calculated, the results are then smoothed over given time intervals. After the smoothed energy value is obtained, one then computes the logarithmic value of the total energy. After computing the logarithmic value of the total energy, one performs a box-car integration or average for speech level estimate at the input to the bandpass filter array. The next step incorporates the use of an asymmetric filter to filter the log energy for speech detection by monitoring the rise time of the speech signal. It is immediately noted that the speech signal is referred to generically and the incoming signal can be noise, an artifact (art) which is not a noise or a speech signal and may be due to heavy breathing or some other characteristic the speaker's voice which essentially is not intelligence and is not noise. In any event, it may also be a true speech signal.

To determine this, one therefore monitors the instantaneous values of the logarithmic energy over the smoothed energy. The algorithm operates to divide the time interval which is associated with the rise and fall times of the signal into given periods. When the rise is positive as compared to negative, certain decisions are made as to the nature of the incoming signal to be recognized. These decisions as indicated above, determine whether it is speech, an artifact or pure noise. For example, for an interval where the rise is negative, it is absolutely assumed that if the rise continues to be negative then this is a noise signal. The noise signal is accepted and the system continues to track the signal by smoothing the noise values and using these values to contribute to the averaged noise energy and utilizing the calculated values to apply the same to the noise estimate. This is then utilized to form the template. The care in regard to a positive transition is more difficult.

A positive transition can indicate noise, an artifact or speech. In order to make this determination, one performs and operates on an integral of a non-linear function. Based on comparing the integral value with certain thresholds, one can therefore determine whether or not a positive rise is indicative of speech, noise or an artifact. In this manner the values which emanate from the speech and noise tracker module are indicative of the true speech value. The programs for the speech and noise tracker are shown in FIGS. 5A–5C where the complete program is indicated.

Figure 5A:
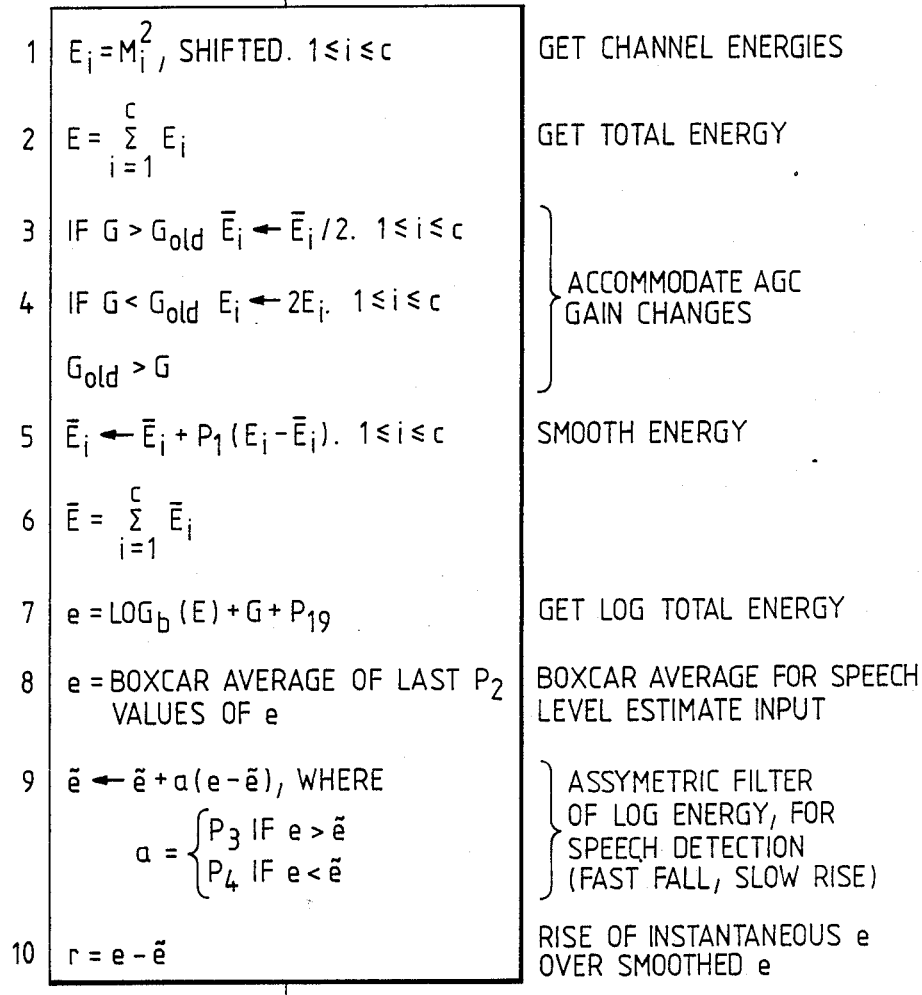
FIGS. 5A-5C are detailed flow charts depicting the operation of a speech and noise tracker according to this invention.
Figure 5B:
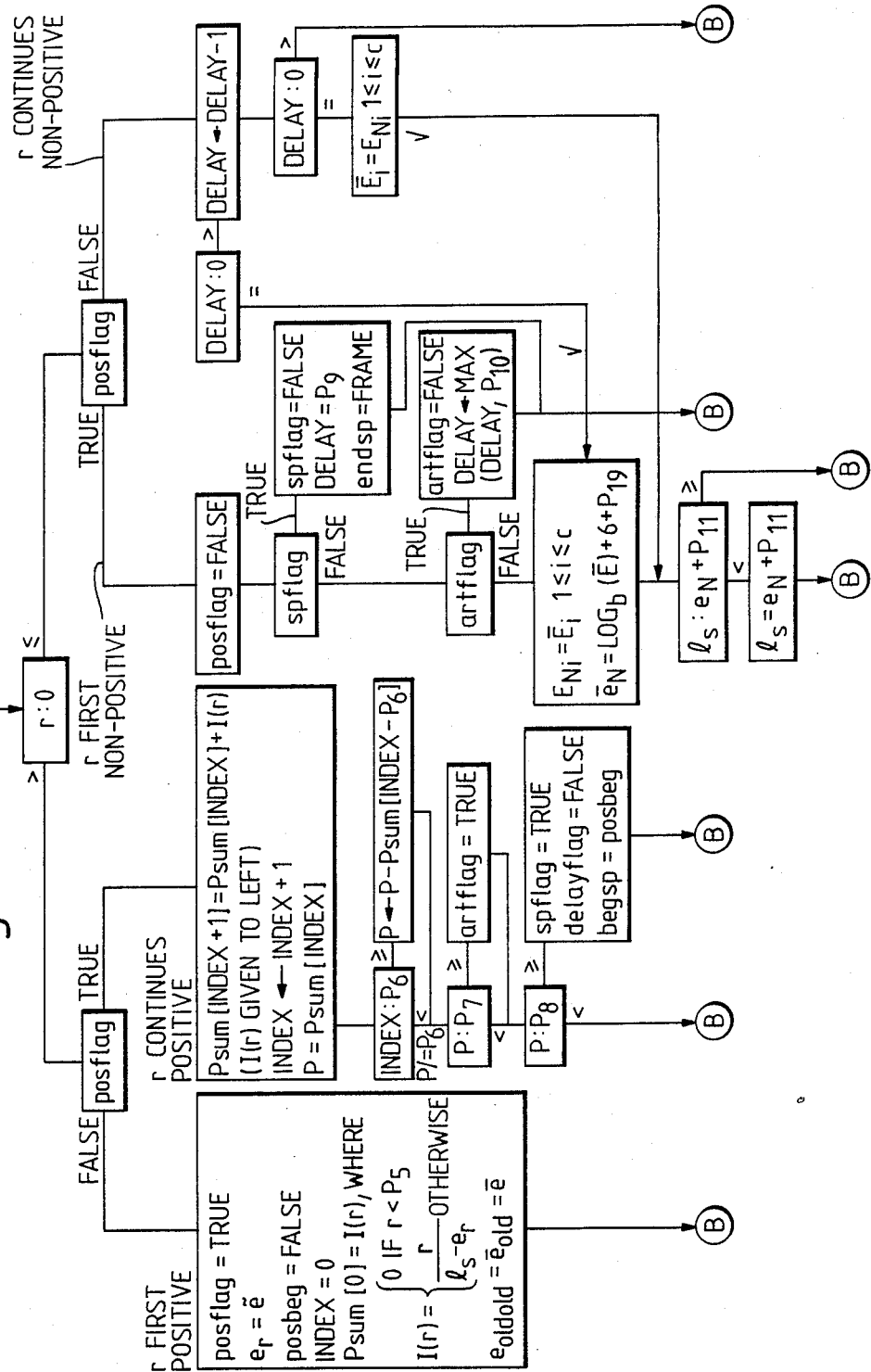
Figure 5C:
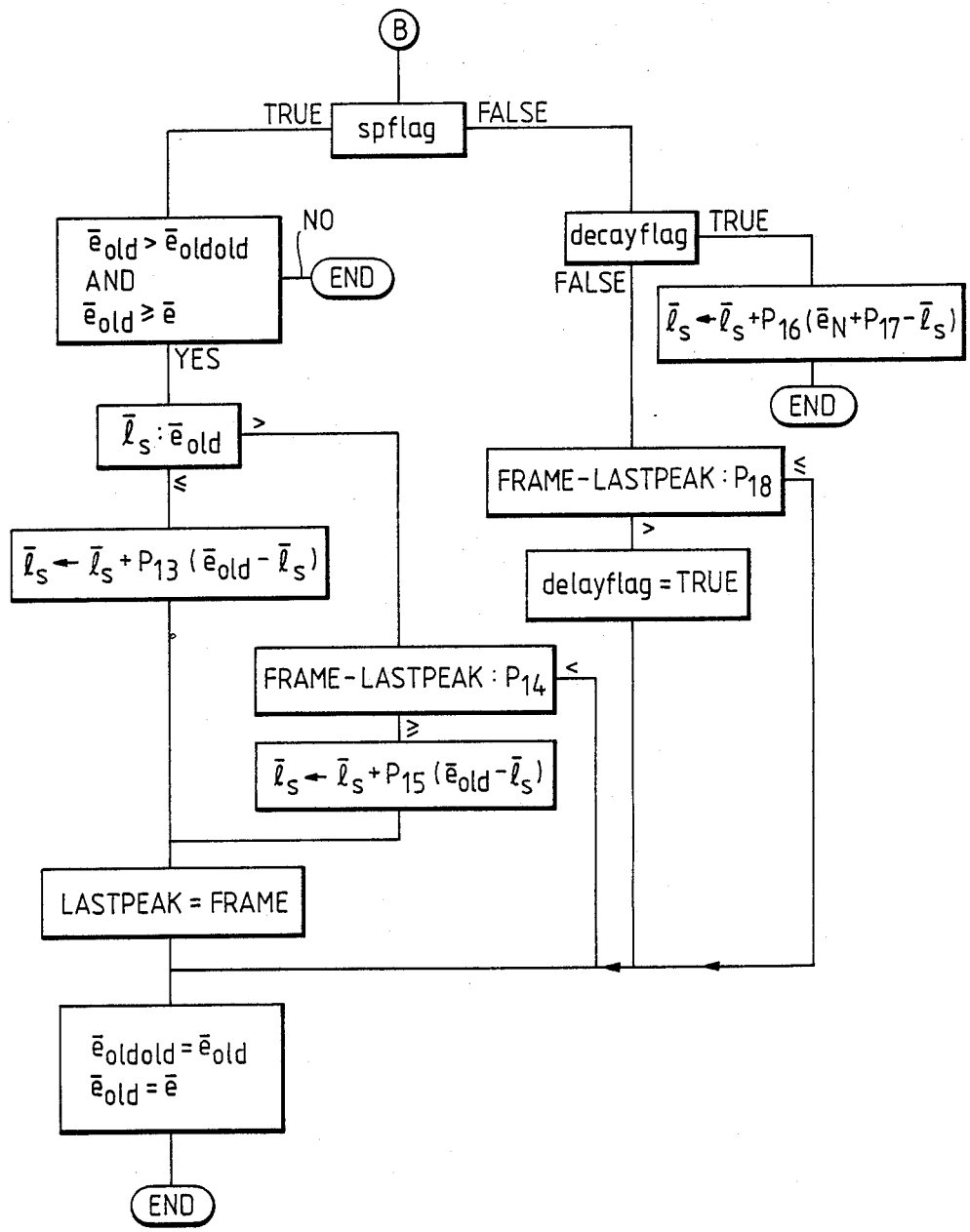

FIG. 6 shows the definition of engineering parameters which are necessary to understand the programming formats depicted in FIGS. 5A–5C. For further explanation, the procedure is accomplished once every single frame and operates as follows. The first step in the procedure as indicated in FIG. 5A is to obtain the energy in each channel as well as the total energy. This is shown in Steps 1 and 2. Then the energy is filtered in each channel taking the automatic gain control scale changes into account as shown in Steps 3 and 4. The next step is to smooth the energy values so that one obtains smooth log values of the energy which are corrected for AGC. This is shown in Steps 5, 6 and 7. The next step is that one obtains a box-car average for the speech level estimate at Step 8. Then one obtains the asymmetric filter value of the energy and the rise of the current energy over the filtered value which is shown in Steps 9 and 10. One then exits this particular aspect of the program and goes to FIG. 5B. The variable r which is shown in Step 10 of FIG. 5A is the amount the current log energy exceeds its asymmetrically smooth value. During vocalic nuclei r goes positive and stays positive for a considerable interval.

This is indicated as having special significance to its positive and negative intervals and hence special processing is required when it first becomes positive or first becomes negative. This is shown in detail in FIG. 5B. In any event, when r first becomes positive, one records the frame number as the possible beginning of a definite speech nucleus. Then one resets the value of P which is used to decide if it is speech. Then one operates to suspend noise tracking. In any event, while r remains positive, one accumulates the values of p and sets the artifact and speech flags if P exceeds specified thresholds. These are indicated at the left of FIG. 5B. When r first becomes positive, one resets the noise tracker to the last known noise values and hence resumes noise tracking after a given delay if the speech or artifact was detected while making sure that the speech level assumed is high enough from the noise level. If the speech was detected in this rise, the frame is recorded in regard to its number as the end of a known speech interval.

In any event, while r remains negative, one continues to track noise after a given delay. This is all shown in the enclosed flow charts which clearly describe the various operations provided.

FIG. 5C essentially shows the generation of output variables which as indicated are used to provide the operational template data as for example shown in FIGS. 2 and 4. Thus as one can ascertain from the above, the major aspect of the present system is to provide templates whereby noise is added in a correct and anticipated way to formulate a template which essentially has an expected signal to noise ratio level associated therewith. The noise level associated with the template is indicative of an estimate of the noise which will be present in the upcoming signal. In this manner one substantially increases the recognition probability of a speech recognition system.

It is noted that the generation of such templates utilizing the addition of noise as indicated above can be employed in any speech recognition system utilizing templates to provide a comparison of the same with an incoming signal to determine whether that signal is in fact speech, an artifact, or noise. Thus the system operates to provide speech recognition templates which are first formed in the absence of noise and which are improved for use in the presence of noise by modifying them to be equal to their expected value in the presence of noise.

I claim:
1. In a speech recognition system of the type including a storage for storing initial templates representing spectral values of recognizable speech in the absence of noise, a spectrum analyzer for providing spectral values of utterances of an incoming signal representing speech in the presence of noise at an output thereof, and a recognition module for comparing operational templates with the output spectral values from said spectrum analyzer to provide an output upon a favorable comparison indicative of the presence of recognized speech in said utterances, the improvement therewith of apparatus for generating said operation templates, comprising:
   first means coupled to said spectrum analyzer for providing an estimated noise signal indicative of the noise in the incoming signal, and second means coupled to said first means and responsive to said estimated noise signal to generate said operational templates which are modified from said initial templates according to said estimated noise signal,
   wherein said first means includes a speech and noise level tracking means having a speech tracking portion operative to detect a speech signal in the presence of noise in said utterances and to provide at one output thereof a first signal indicative of an average power of the speech signal in the presence of noise which is a scalar speech level value associated with the speech signal, and a noise tracking portion operative to detect noise in said utterances and to provide a given time period of said utterances which is a vector of spectral values representing an estimate of the noise, and
   wherein said second means generates said operational templates by adjusting the speech level of said initial templates in accordance with said first signal and by adding spectral values of the estimate of the noise in accordance with said second signal to said initial templates, whereby the operational templates have the estimated noise of and the same signal-to-noise ratio as the utterances of the incoming signal in order to obtain an improved speech recognition performance of said recognition module.

2. The speech recognition system according to claim 1, wherein said spectrum analyzer comprises a plurality of bandpass filters arranged in a filter bank array with each filter adapted to pass a given spectral component according to the bandwidth of the said filter.

3. The speech recognition system according to claim 2, wherein said first means includes means for measuring the average and the variance of said bandpass filters to provide an estimate of the noise passing properties of each filter.

4. The speech recognition system according to claim 3, wherein said noise estimate is estimated on the basis of said filter response to Gaussian noise.

5. The speech recognition system according to claim 1, wherein said templates generated in the absence of noise are noise free token templates and means responsive to said templates to provide an average value to provide at outputs Base Form data, and means for modifying said Base Form data according to a current predicted noise signal.

6. A speech recognition system according to claim 1, further comprising:
processing means coupled to said spectrum analyzer for generating said operational templates for storage by modifying said initial templates according to said estimated noise signal indicative of the presence of noise.

7. The speech recognition system according to claim 6, wherein said processing means said expected calculated value is indicative of the presence of Gaussian noise.

8. The speech recognition system according to claim 6, wherein said processing means includes means for averaging noise-free templates to provide Base Form data outputs and modifying said Base Form data outputs by adding to said data, noise data calculated.

9. The speech recognition system according to claim 6, wherein said processing means includes averaging means for providing at output the average value of successive pairs of said spectral magnitude values as provided by said analyzer,
scaling means coupled to said averaging means output for providing a given length field signal and means for converting said given length field signal to a logarithmic signal for providing one of said Base Form data outputs.

10. The speech recognition system according to claim 9, further including,
squaring means coupled to said averaging means for providing at an output a vector signal indicative of the squared magnitude of said average value of successive pairs and means coupled to the output of said squaring means for providing other ones of said Base Form data outputs.

11. The speech recognition system according to claim 10, wherein said means coupled to the output of said squaring means includes relative energy forming means responsive to said vector signal to provide a Base Form energy parameter and speech and noise level tracker means for providing at an output a Base Form parameter indicative of the power level of both speech and noise.

12. A method of forming operational templates for use in a speech recognition system for recognizing speech in the presence of noise in utterances of an incoming signal based upon comparison of spectral values thereof to the operational templates, comprising the steps of:
providing an estimated noise signal by detecting a speech signal in the presence of noise in the incoming signal and providing a first signal indicative of an average power of the speech signal in the presence of noise which is a scalar speech level value associated with the speech signal, and detecting noise in said utterances and providing a second signal indicative of an average power of the noise over a given time period of said utterances which is a vector of spectral values representing an estimate of the noise, and
modifying initial templates representing recognizable speech in the absence of noise by adjusting the speech level of said initial templates in accordance with said first signal and by adding spectral values of the estimate of the noise in accordance with said second signal to said initial templates, in order to form said operational templates having the estimated noise of and the same signal-to-noise ratio as the utterances of the incoming signal for obtaining an improved speech recognition performance.

13. The method according to claim 12, wherein said step of providing includes measuring the response of a given speech processing channel with respect to noise and estimating said signal to be provided based on said measurement.

14. The method according to claim 12, wherein said step of modifying includes first forming a Base Form template relatively free from noise and,
modifying said Base Form template according to said signal indicative of said expected noise level.

15. The method according to claim 12, wherein the step of modifying includes forming Base Form templates relatively free from noise,
adding noise to each template and,
averaging said added noise template data to form new templates according to said analyzed data.

* * * * *